March 13, 1934.     C. WALTER     1,951,042
ROLLER BEARING CAGE
Filed Nov. 19, 1928
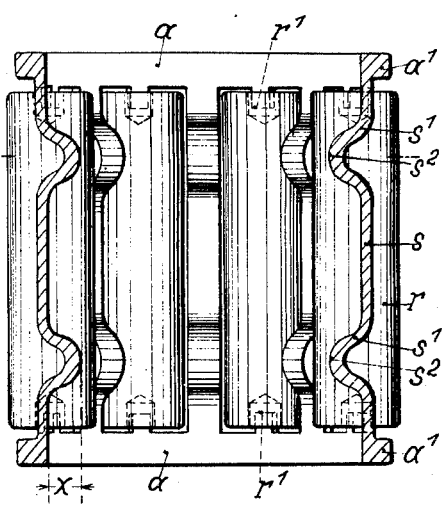
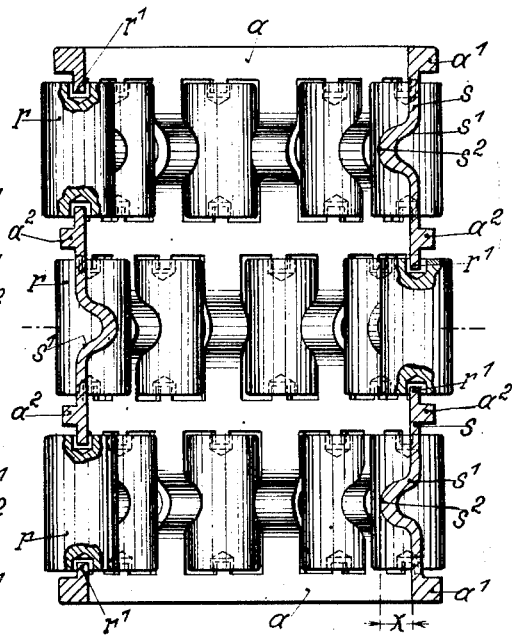
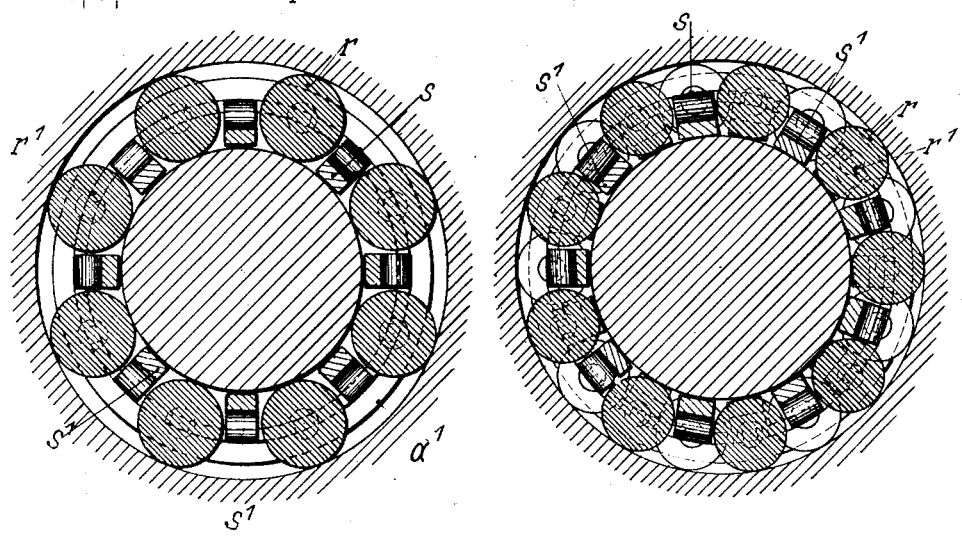
INVENTOR.
CARL WALTER Patented Mar. 13, 1934

1,951,042

UNITED STATES PATENT OFFICE 1,951,042

ROLLER BEARING CAGE

Carl Walter, Barmen, Germany, assignor to the firm Pfingstmann - Werke Aktiengesellschaft, Recklinghausen-Sud, Germany Application November 19, 1928, Serial No. 320,425
In Germany November 19, 1927

5 Claims. (Cl. 308—217)

The invention relates to a new method of manufacturing sheet metal cages for roller bearings for which I have applied for patents in Germany, November 19, 1927, W. 77716 and Germany, April 23rd, 1928, W. 79166 which cages possess longitudinal bridges at least between some of the rollers, these bridges interconnecting the lateral end rings of the cage.

These bridges usually are provided with indentations or bulges that serve as abutting surfaces for the cage and hitherto are applied by pressing them into the bridges. According to the invention the manufacture of these bulges is considerably simplified and rendered less costly by rolling them into the sheet metal strips that form the cage. It will further be of advantage to roll-in these bulges from the first already when rolling the sheet metal strips, serving to form the cage, because not only time and manufacturing costs are saved by this combined operation, but also the material is spared in a higher degree, especially on the bulges, when hot rolling the latter in unison with the strip itself than by cold pressing the bulges into the already finished strip, as hitherto usual.

The invention further provides the rolling in of bulges of such a size that their height approximately corresponds to the radius of the rollers, and to so bulge the entire cage after the rollers have been put in place, that the bridges, the bulges of which are still enlarged correspondingly by this bulging, come to abut on one of the race rings or surfaces of the bearing, whereby the means that hold the rollers in the cage are discharged accordingly.

As the bulges in the course of time wear on their contact places, the invention further provides to give them an increased wall thickness on these places.

To reinforce the roller cage, further longitudinal ribs may be rolled into the sheet metal strip when the cage is formed, these ribs forming annular reinforcing flanges on the finished cage and being enabled to be applied together with the supporting bulges in one common rolling operation.

In order to allow of the invention to be more easily understood, two roller cages manufactured in accordance with the improved method are illustrated by way of example in the drawing which accompanies and forms part of this specification. In this drawing Figure 1 is a one-race roller cage in longitudinal section, Figure 2 is the corresponding cross section;

Figure 3 shows a three-race roller cage in longitudinal section, while

Figure 4 is the corresponding cross section.

Referring first to the cage shown in Figures 1 and 2, the roller cage illustrated possesses longitudinal bridges $s$ at least between some of the rollers $r$, these bridges $s$ interconnecting the end rings $a$ of the cage. The bridges $s$ have bulges $s^1$ which are applied by rolling to the sheet metal strip when rolling out the latter or by rolling-in them in a subsequent operation. The height denoted by $x$ in Figure 1, of the bulges $s^1$ is determined so as to be somewhat smaller than the radius of the rollers $r$.

On each of their edges the cage further has a reinforcing flange $a^1$ which likewise is applied by rolling. The rollers $r$ are mounted in the cage by projections $r^1$ inwardly extending from the edges of the rings and engaging between them the rollers $r$. The roller recesses are suitably punched from the strip.

With a one-race roller cage as illustrated in Figures 1 and 2, each bridge $s$ suitably possesses two bulges $s^1$ each located near its ends. Very long roller cages may have a third bulge in the midst. The bulges may be arranged on each bridge $s$ or only on some of them.

With multi-race roller cages as illustrated in Figures 3 and 4, advantageously bulges $s^1$ are provided on all or some of the bridges $s$ of at least the two extreme series of bridges. If the cage is very long, it will be suitable to provide the bulges still on one or more of the intermediate bridge series. With multi-race cages the series of bridges suitably are staggered in circumferential direction, preferably by such angular amounts that always a bridge of one series is opposite to a gap of the neighboring one. This arrangement makes the cage more solid than can be obtained by arranging the bridges in common straight lines. The cage illustrated in Figures 3 and 4 further possesses besides the edge flanges $a^1$ still intermediate reinforcing collars $a^2$ arranged between the roller series and likewise applied by rolling.

In the embodiments shown the bulges $s^1$ at least on their top denoted by $s^2$ have increased wall thickness that allows for the wear taking place on this place.

The described roller cages are manufactured by either rolling the supporting bulges $s^1$ and reinforcing ribs $a^1$, $a^2$ from the first when rolling out the sheet metal strips themselves the width of which corresponds to the length of the cage or allows of cages to be cut from these strips, or the bulges $s^1$ and ribs $a^1$, $a^2$ are subsequently applied by rolling on the preliminarily rolled smooth sheet metal strips. Thereupon the recesses required to lodge the rollers $r$ are punched in the sheet metal when the latter is still in flat state; the strip is bent circularly and its ends united by welding. The recesses may also be punched after the strip has been bent and welded so as to form the cage. Finally the rollers $r$ are inserted between the respective journals $r^1$ and then the entire complete cage is so bulged in axial direction that the journals $r^1$ enter to the desired extent the corresponding holes of the rollers and that besides such a height is imparted to the bulges $s^1$ by this finish bulging operation that their height becomes equal to the radius of the rollers.

I claim:

1. As a new article of manufacture a roller bearing cage having roller recesses and bridges therebetween, said bridges having rolled in them radially extending bulges of a cross section thicker than that of the smooth portion of the bridge.

2. As a new article of manufacture a roller bearing cage having roller recesses and bridges therebetween, said bridges having rolled in them radially extending bulges of a cross section thicker than that of the smooth portion of the bridge and of a height such as to be capable to abut on the respective race surface of the bearing.

3. As a new article of manufacture a roller bearing cage having roller recesses and bridges therebetween, rolled-in annular reinforcing ribs, and rolled-in radially extending bulges on said bridges.

4. As a new article of manufacture a roller bearing cage having roller recesses and bridges therebetween, rolled-in annular reinforcing ribs, and rolled-in radially extending bulges on said bridges of a height such as to be capable to abut on the respective race surface of the bearing and of a cross section thicker than that of the smooth portion of the bridges.

5. As a new article of manufacture a roller bearing cage having a plurality of juxtaposed series of roller recesses arranged in staggered mutual relation, at least some of the bridges existing between the individual recesses of the extreme ones of said series having bulges located at least approximately in the midst of the respective recesses and extending up to the respective race surface of the bearing.

CARL WALTER.